United States Patent
Fontana et al.

(10) Patent No.: US 7,433,205 B2
(45) Date of Patent: Oct. 7, 2008

(54) SUPPORTING DEVICE FOR BUSBARS IN CABINETS FOR ELECTRICAL SWITCHBOARDS

(75) Inventors: Rodolfo Fontana, Clivio (IT); Giuseppe Morini, Brescia (IT); Cristian Cagliani, Molteno (IT); Daniele Cagliani, Molteno (IT)

(73) Assignee: ABB S.p.A., Milan (IT)

( * ) Notice: Subject to any disclaimer, the term of this patent is extended or adjusted under 35 U.S.C. 154(b) by 537 days.

(21) Appl. No.: 11/013,806

(22) Filed: Dec. 17, 2004

(65) Prior Publication Data

US 2005/0133679 A1 Jun. 23, 2005

(30) Foreign Application Priority Data

Dec. 17, 2003 (IT) .......................... BG2003A0060

(51) Int. Cl.
*H02B 1/01* (2006.01)
(52) U.S. Cl. .................. 361/825; 361/807; 361/810
(58) Field of Classification Search ......... 361/825–826; 174/71–72, 99, 149
See application file for complete search history.

(56) References Cited

U.S. PATENT DOCUMENTS 5,847,321 A * 12/1998 Carle et al. ............... 174/99 B 6,100,473 A * 8/2000 Wagener .................. 174/99 R

FOREIGN PATENT DOCUMENTS

EP 1215789 * 12/2000

* cited by examiner

*Primary Examiner*—Hung S Bui
(74) *Attorney, Agent, or Firm*—Connolly Bove Lodge & Hutz LLP; Myron Keith Wyche

(57) ABSTRACT

Described herein is a supporting device for busbars in a cabinet for an electrical switchboard comprising: at least one first module with a shaped body designed to be connected to a supporting element of the cabinet; the first module is made substantially of insulating material and has a first wall, designed to be set resting on the supporting element, and a second wall, along which there is defined at least one first coupling seat; and at least one second module with a shaped body made substantially of insulating material, which has a third wall, along which there is defined at least one second coupling seat, and a fourth wall, along which there is defined at least one third coupling seat. The second module is operatively coupleable to the first module alternatively with said third or said fourth wall facing said second wall so that said first seat mates geometrically with said second or said third seat, so forming a seat for housing a busbar.

18 Claims, 6 Drawing Sheets

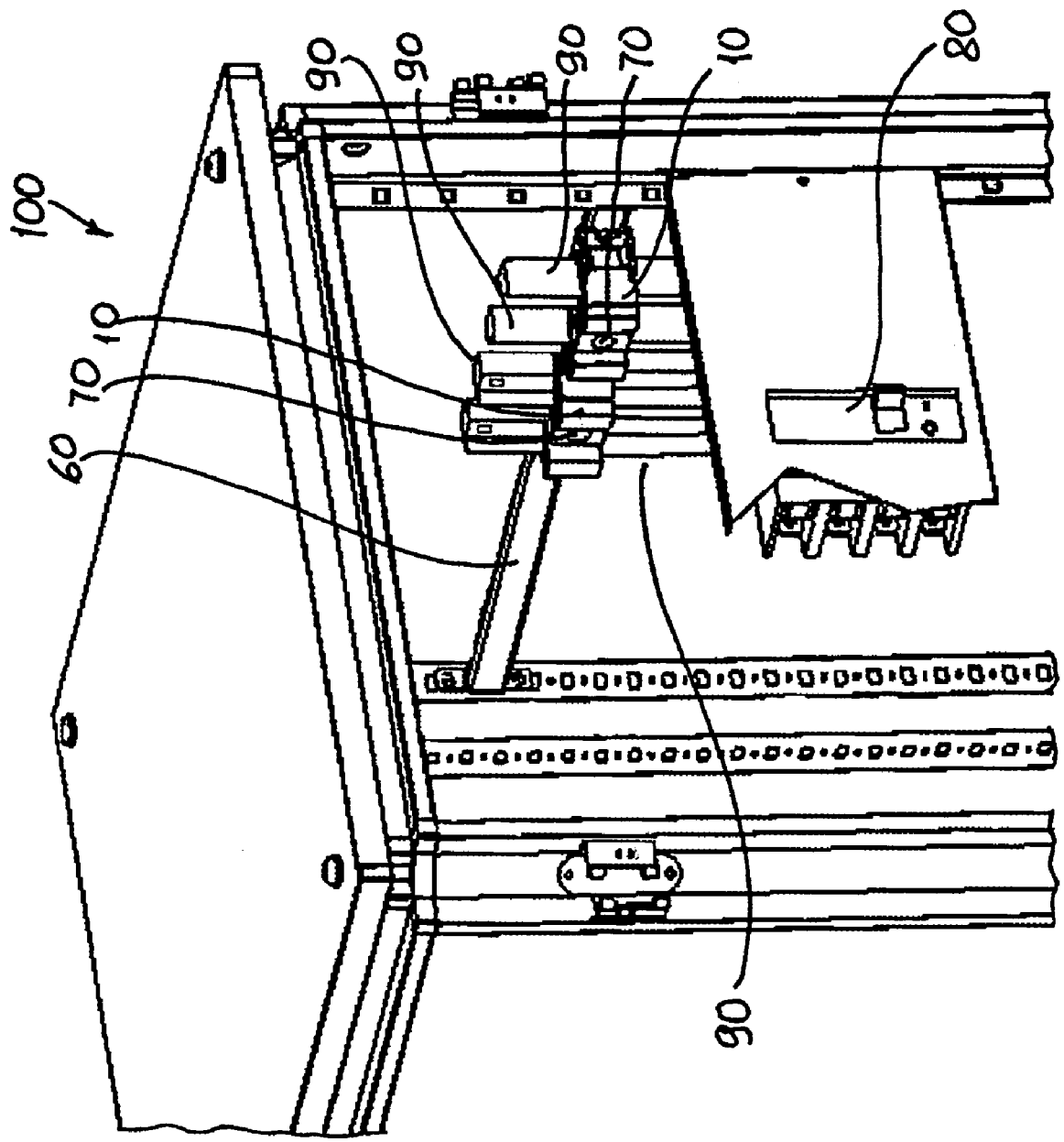

SUPPORTING DEVICE FOR BUSBARS IN CABINETS FOR ELECTRICAL SWITCHBOARDS

CROSS-REFERENCE TO RELATED APPLICATIONS

This application claims the benefit of Italian Application No. BG 2003 A 000060, filed on Dec. 17, 2003 by FONTANA, Rodolfo, et al., entitled "A SUPPORTING DEVICE FOR BUSBARS IN CABINETS FOR ELECTRICAL SWITCHBOARDS", the entire contents of which are hereby incorporated by reference, and for which priority benefit is claimed under 35 U.S.C. §119.

The present invention relates to a supporting device for busbars in a cabinet for an electrical switchboard, said device having improved functions and characteristics.

It is known that in distribution switchboards or the like for distributing electrical energy to a number of apparatuses, such as for example switches, pushbuttons, and control instruments, there is used a system of metal bars arranged parallel to one another. Said bars are connected each to a corresponding polarity of the supply network for supplying electrical energy; the connection between busbars and apparatuses is formed by means of appropriate conductors, such as for example plates, appropriately shaped according to the type of apparatus.

Within the cabinets of the switchboards, the bars are coupled geometrically to purposely designed devices that support the bars, insulating them electrically from one another, and enable their connection to the more resistant frame of the cabinet. In this way, in addition to the normal structural support, said devices also enable the possible electrodynamic stresses produced by the flow of current in the bars to be discharged on the frame.

At the current state of the art, the use of supporting devices of a known type presents some drawbacks, above all as regards the flexibility in the applications.

For example, there is in practice known the use of supporting devices of a traditional type constituted by a main insulating body comprising at least two appropriately shaped parts, which are connected to one another so as to define housing seats in which the bars are gripped, insulating them from one another. In this case, a drawback is represented by the fact that, once the structure of the two parts making up the device has been defined, it is possible to obtain only one predefined configuration of coupling to the bars. The adoption, where necessary, of variants in the configuration of assembly of the bars with respect to the basic configuration proves unrealizable and usually involves recourse to other devices that are differently configured, so causing an increase in the production costs.

The same drawback usually arises also when the same basic configuration is maintained, and there are bars of the same shape but with different transverse dimensions, for example with increased thicknesses for the conduction of current of higher amperage. Also in this case, in fact, either it is necessary to use additional devices or else it is necessary to start from devices purposely sized for bars of greater thickness, then using adaptor modules in the case where bars of smaller thickness are used. In both of the solutions, it is in any case possible to envisage only one configuration of assembly.

Finally, further drawbacks are represented by the modalities with which currently the two parts that constitute the devices are connected to one another and to the frame of the cabinet. In fact, according to traditional solutions, these two parts are connected to one another by means of fixing systems, such as for example screws, etc. The connection of the bars to the frame is then obtained via the use of further components fixed to the main insulating body and to the supporting structure. Said solution is clearly disadvantageous in so far as it involves the use of a number of constructional components, presenting a clear division between the parts for coupling to the bars and those for fixing to the supporting structure. This is reflected in a structural complication with a consequent increase in the production costs and in the production times, as well as in the times and difficulties of assembly.

The primary task of the present invention is to provide a supporting device for busbars in a cabinet for an electrical switchboard, which will enable the drawbacks referred to above to be overcome, and in particular which, as compared to the devices of a known type, will enable a number of configurations to be obtained, so increasing the flexibility of application.

Within this task, a purpose of the present invention is to provide a supporting device for busbars in a cabinet for an electrical switchboard, the structure of which may be obtained with an optimized number of parts that can be fitted to one another in a simplified way as compared to the devices of a known type.

Another purpose of the present invention is to provide a supporting device for busbars in a cabinet for an electrical switchboard that is suited to a simplified assembly with the bars, as well as to fixing to the supporting structure, thus simplifying and reducing the installation steps and times.

Not the least important purpose of the present invention is to provide a supporting device for busbars in a cabinet for an electrical switchboard that will present high reliability and be relatively easy to manufacture at competitive costs.

The above task, as well as the above and yet other purposes that will emerge more clearly from what follows, is achieved by a supporting device for busbars in a cabinet for an electrical switchboard comprising at least one first module having a shaped body designed to be connected to a supporting element of the cabinet, said first module being made substantially of electrically insulating material and having a first wall designed to be set resting on said supporting element and a second wall, along which there is defined at least one first coupling seat. The device according to the invention is characterized in that it comprises at least one second module having a shaped body made substantially of electrically insulating material having a third wall, along which there is defined at least one second coupling seat, and a fourth wall, along which there is defined at least one third coupling seat, said second module being operatively coupleable to said first module alternatively with said third or said fourth wall facing said second wall so that said first seat mates geometrically with said second or said third seat, so forming a seat for housing a busbar.

Further characteristics and advantages of the invention will emerge more clearly from the description of preferred, but non-exclusive, embodiments of the device according to the invention, illustrated purely by way of indicative and non-limiting example in the attached plate of drawings, in which:

FIG. 6 is a schematic representation of the device according to the invention coupled to a system of bars within a cabinet for an electrical switchboard.

With reference to the above figures, the supporting device for busbars according to the invention comprises at least one first module 1, designed to be connected to a supporting element, typically one of the elements making up the cabinet 100 of an electrical switchboard, for example a cross member 60 schematically illustrated in FIG. 5, and at least one second module 10 that is to be coupled to the first module 1 according to the modalities that will be described in detail in what follows.

Figure 1:
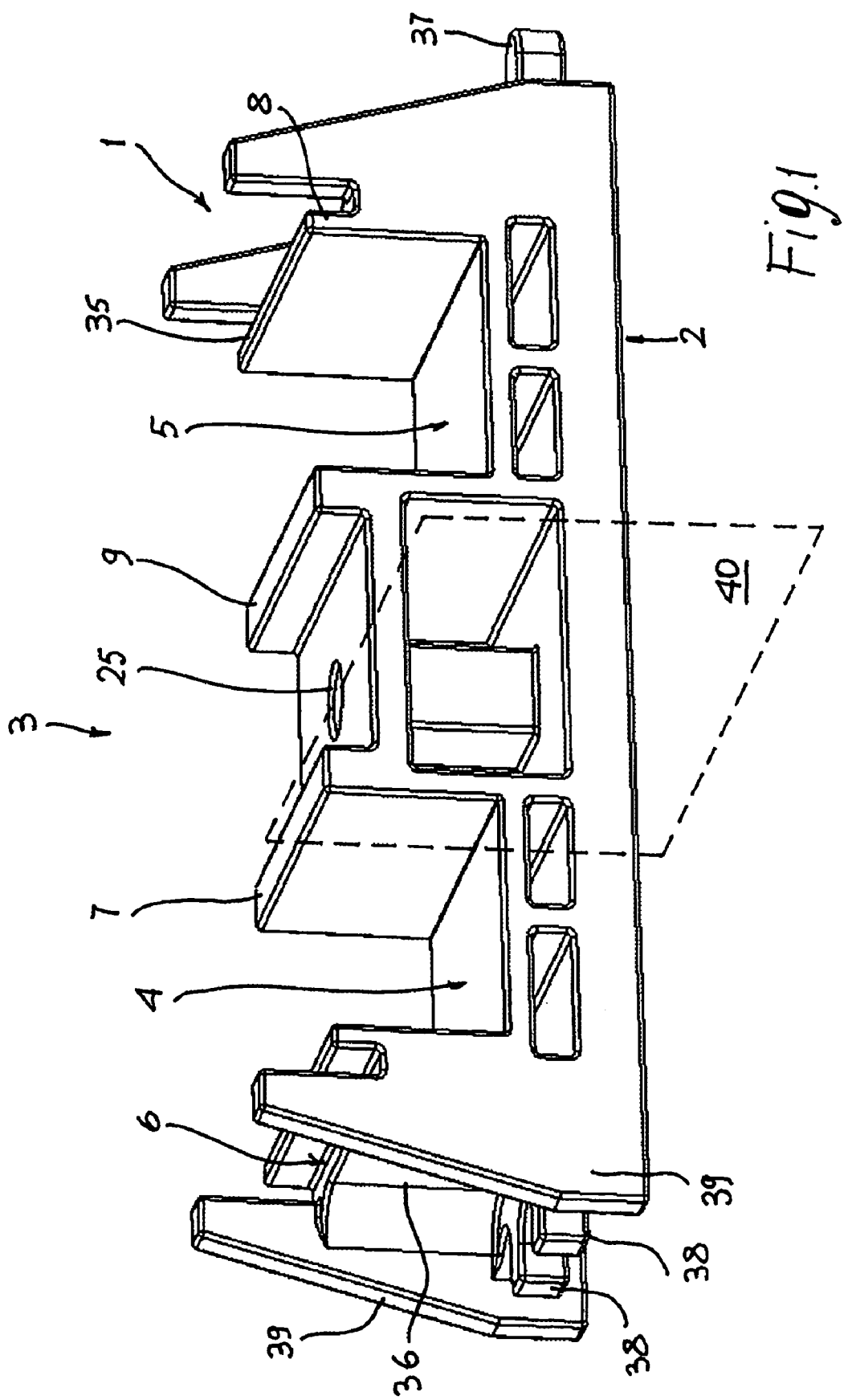
FIGS. 1 and 2 are perspective views illustrating two modules of the device according to the invention.
Figure 2:
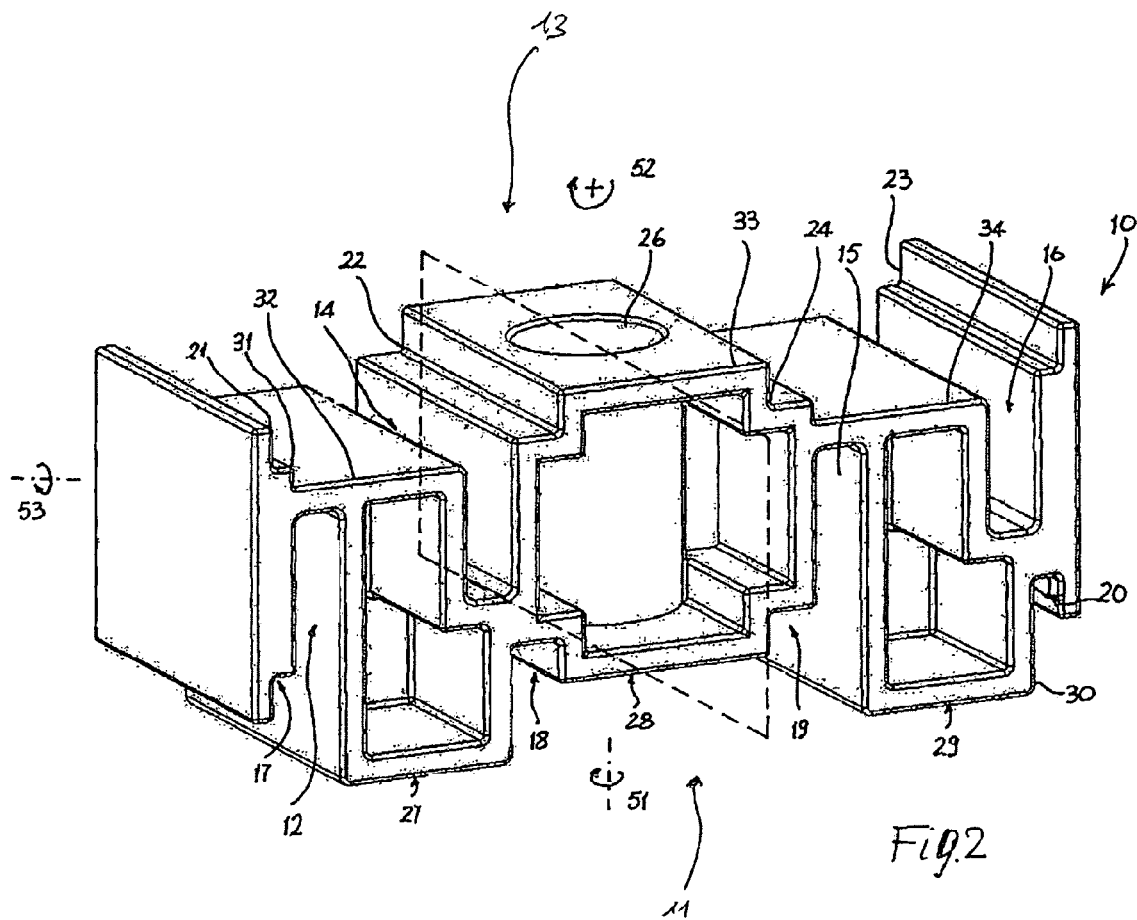

As illustrated in FIG. 1, the first module 1 has a shaped body made substantially of electrically insulating material, for example thermoplastic or thermosetting material, and has a first wall or face 2, designed to be set resting on the supporting element 60, and a second wall or face 3, along which there is defined at least one first coupling seat 4. As illustrated in FIG. 2, the second module 10 also has a shaped body made substantially of electrically insulating material, for example thermoplastic or thermosetting material, and has a third wall or face 11, along which there is defined at least one second coupling seat 12, and a fourth wall or face 13, along which there is defined at least one third coupling seat 14. Advantageously, in the device according to the invention, the two modules 1 and 10 are shaped so that the second module 10 is operatively coupleable to the first module 1 or alternatively to the third wall 11 (FIG. 3) or to the fourth wall 13 (FIG. 4) facing the second wall 3 so that the first seat 4 (and corresponding boundary walls) mates geometrically with the second seat 12 (and corresponding walls) or the third seat 14 (and corresponding walls), so forming a seat for housing a busbar.

In a preferred embodiment illustrated in FIG. 1, on the second wall 3 there is defined a further fourth coupling seat 5, with the two seats 4 and 5 that are arranged substantially symmetrical to one another with respect to an imaginary middle plane of the first module 1 perpendicular to the second wall 3, designated for reasons of clarity of description in FIG. 1 by the reference number 40. In the embodiment illustrated, the two seats 4 and 5 have a U-shaped profile. Clearly, according to the requirements of application, the two seats could be differently configured, or else arranged along the wall 3 in different positions with respect to one another.

Accordingly, also on the third wall 11 of the module 10 there is defined a fifth coupling seat 15, and on the fourth wall 13 there is defined a sixth coupling seat 16. Advantageously, both the two seats 12 and 15 defined on the wall 11 and the two seats 14 and 16 are arranged along the two corresponding walls 11 and 13 and are shaped so that, in the step of coupling of the two modules 1 and 10, each of them can be geometrically mated alternatively either with the first seat 4 or with the second seat 5, so forming in pairs two seats for housing two corresponding bars, as illustrated, for example, in FIGS. 3 and 4. In particular, in the embodiment illustrated in FIG. 2, the four seats 12, 14, 15 and 16 have a U-shaped profile with the two branches of the U of lengths different from one another and profiles set two (12/14) by two (15/16) upside down with respect to one another. Clearly, also in this case different alternatives are possible according to the needs of application, both as regards the configuration and as regards the mutual positioning.

Advantageously, in a preferred embodiment, the two modules 1 and 10 are moreover shaped so as to present on their respective body geometrical coupling means that enable a direct reciprocal structural connection thereof, according to positions with respect to one another predefined according to desired configurations.

In particular, the coupling means comprise first, second, and third means of connection defined, respectively, on the second wall 3, on the third wall 11, and on the fourth wall 13, and are configured so that the first means of connection will be coupleable alternatively to the second means of connection or the third means of connection.

As illustrated in FIG. 1, the first means of connection comprise at least one first step-shaped surface 6 and one first tooth 7, defined at the sides of the first seat 4 on sides opposite to one another in a position corresponding to the two edges of the first seat. Preferably, the first means of connection moreover comprise a second step-shaped surface 8 and a second tooth 9 arranged at the sides of the fourth seat 5 on sides opposite to one another, with the first step-like surface 6 and the second step-like surface 8 that are arranged at the two ends of the second wall 3 symmetrically to one another with respect to the middle plane 40. Furthermore, also the two teeth 7 and 9 are arranged preferably symmetrical to one another with respect to the middle plane 40.

As illustrated in FIG. 2, the second means of connection comprise at least one third step-shaped surface 17, defined in a position corresponding to an edge of the second seat 12 for coupling to one end of the wall 11, and at least one first U-shaped groove 18, in which the two branches of the U have, in the embodiment illustrated, lengths that are different from one another, with the longer branch connected to the seat 12 by a rectilinear stretch of wall 27. Preferably, the second means of connection further comprise: a second groove 19, which is substantially L-shaped, is set in a position corresponding to an edge of the fifth seat 15 and is connected to the groove 18 by a rectilinear stretch of wall 28; and a fourth step-shaped surface 20, which is defined in a position corresponding to the other end of the wall 11 and is connected to the edge of the seat 15 by two rectilinear stretches of wall 29 and 30 set in an L-shaped arrangement with respect to one another.

In turn, the third means of connection comprise: at least one fifth step-shaped surface 21, which is defined in a position corresponding to one end of the fourth wall 13 and is connected to the edge of the seat 14 by two rectilinear stretches of wall 31 and 32; and at least one sixth step-shaped surface 22, defined in a position corresponding to an edge of the third coupling seat 14. Preferably, the third means of connection moreover comprise a seventh step-shaped surface 23, defined in a position corresponding to the other end of the fourth wall 13 in the proximity of an edge of the sixth coupling seat 16; and an eighth step-shaped surface 24, connected to the seat 16 and to the step-like surface 22 by means of two rectilinear stretches of wall, 34 and 33. In particular, said sixth and eighth step-shaped surfaces 22 and 24 are arranged substantially symmetrical to one another with respect to an imaginary middle plane 50 of the second module, substantially perpendicular to the walls 11-13. Likewise, also the two step-like surfaces 21 and 23 are arranged so that they are substantially symmetrical to one another with respect to the plane 50.

As illustrated in FIGS. 1 and 2, on the first module 1 and on the second module 10 there are moreover preferably made two through channels, respectively 25 and 26, with a substantially rectilinear axis. Said channels are preferably defined along the directrices of, respectively, first-second walls and third-fourth walls, and are arranged in such a way as to be aligned to one another in the step of coupling of the two modules, for the purpose of receiving fixing means 70 for fixing to the supporting element 60, as illustrated in FIG. 5.

Preferably, the shaped body of the first module 1 further comprises a third side wall 35 and a fourth side wall 36 arranged transverse with respect to the first and second walls 2 and 3. Extending from the walls 35 and 36, on sides opposite to one another, are slotting means, which can preferably be geometrically engaged with at least one further module. In particular, said slotting means for coupling comprise at least one projecting tooth 37, for example with a rounded edge, defined on the wall 35, and at least one pair of projecting teeth 38 that delimit between them a U-shaped concavity. In the example illustrated, as may be seen more clearly in FIG. 2, there is defined a pair of teeth 37, whilst from the ends of the wall 36 there moreover extend two transverse flaps 39, the bottom edges of which delimit, together with the two teeth 38, three U-shaped concavities.

Figure 3:
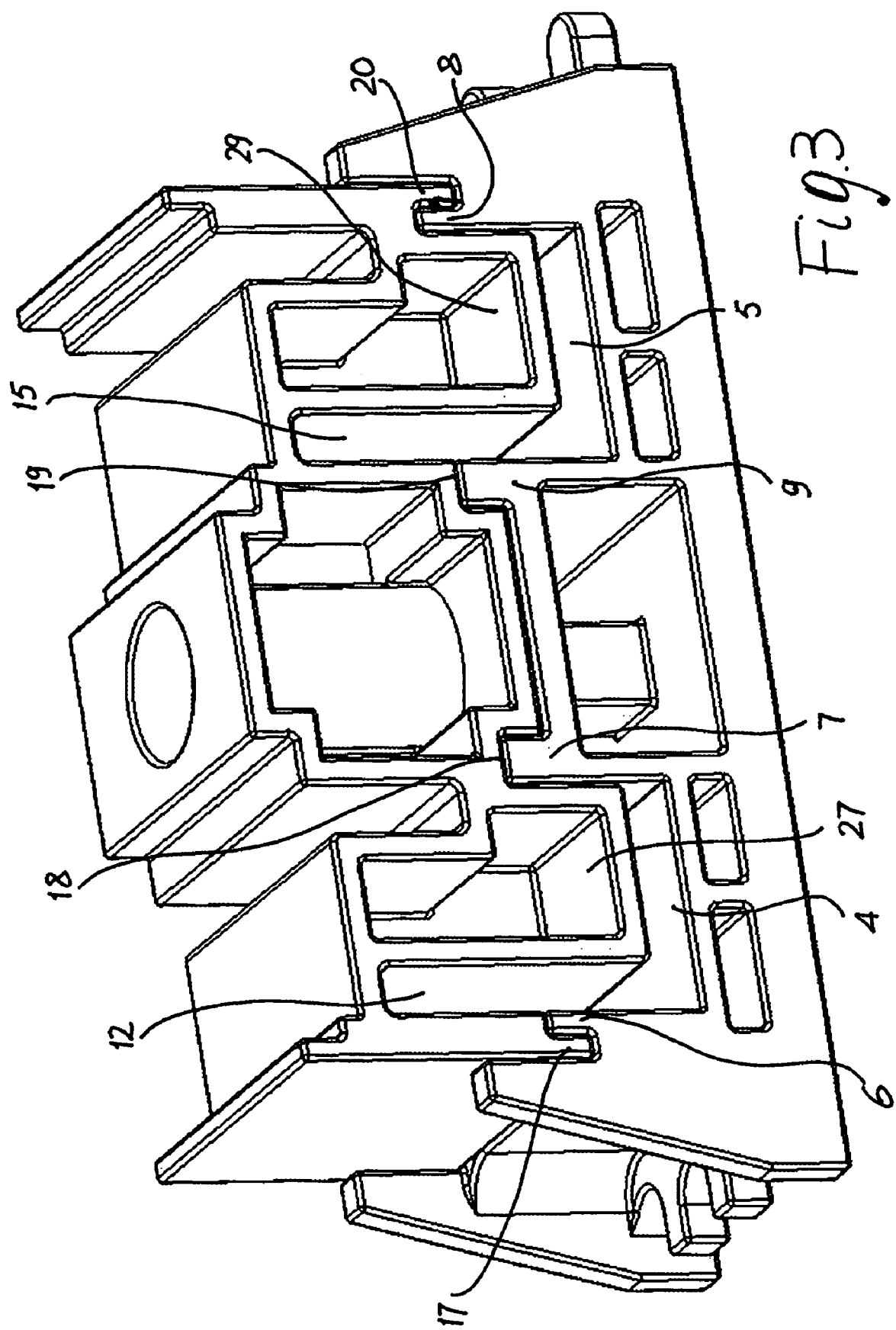
FIG. 3 is a perspective view illustrating the device according to the invention with the two modules of FIGS. 1 and 2 coupled, in a first embodiment.

Thanks to the innovative structure of the two modules 1 and 10, the device according to the invention enables various configurations to be obtained, according to the requirements of application. For example, as illustrated in FIG. 3, in the assembly stage, the module 10 can be coupled to the module 1 with: the step-like surfaces 17 and 20 that are coupled geometrically, respectively, to the step-like surfaces 6 and 8; the two U-shaped grooves 18 and 19, which are coupled to the two teeth 7 and 9; the two seats 4 and 5 (and corresponding boundary walls) that mate, respectively, with the seats 12 and 15 (and corresponding boundary walls), so in practice forming two L-shaped seats (of which in this case the walls 27 and 29 form a perimetral wall) inside which are housed and gripped two accordingly shaped busbars, illustrated in FIG. 5.

Alternatively, starting from the position of FIG. 2, the second module 10 could be coupled to the first module 1 by rotating it through 180° (in both directions of rotation indicated by the arrow 51) about an axis that lies in the middle plane 50, according to the joining walls 11-13. In this case, the step-like surface 20 is coupled to the step-like surface 6, the step-like surface 17 to the step-like surface 8, the groove 18 to the tooth 9, and the groove 19 to the tooth 7. In this way, as illustrated in FIG. 5 (the pair of modules 1 and 10 on the right), the seat 15 (and corresponding boundary walls) is coupled to the seat 4 (and corresponding boundary walls), whilst the seat 12 (and corresponding boundary walls) is coupled to the seat 5 (and corresponding boundary walls), so forming also in this case two L-shaped housing seats (of which also in this case the walls 27 and 29 constitute a perimetral edge), but with the horizontal branches of the L oriented in a direction opposite to the configuration of FIG. 3, or to the similar configuration of FIG. 5 for the pair of modules 1 and 10 on the left.

Advantageously, the two modules 1 and 10 could be coupled to the module 10 rotated, starting from the position of FIG. 2, through 180° (in both directions of rotation, as indicated by the arrow 52) about an axis perpendicular to the plane of the drawing. In this case, illustrated in FIG. 4, we have: the step-like surface couplings 23-6, the step-like surfaces 21-8, the tooth 7-groove 19, and the tooth 9-groove 18. The seat 16 (and corresponding boundary walls) mates with the seat 4 (and corresponding walls), whilst the seat 14 (and corresponding boundary walls) mates with the seat 5 (and corresponding walls), so forming two seats for the housing of two bars. Also in this case, as may be seen in FIG. 4, the two seats for housing the bars (of which in this case the stretches of wall 32 and 34 constitute a perimetral edge) are L-shaped but advantageously with the two branches of each L having thicknesses different from one another. This thus enables the same components to be used with bars of different thickness and hence that conduct higher currents.

Figure 4:
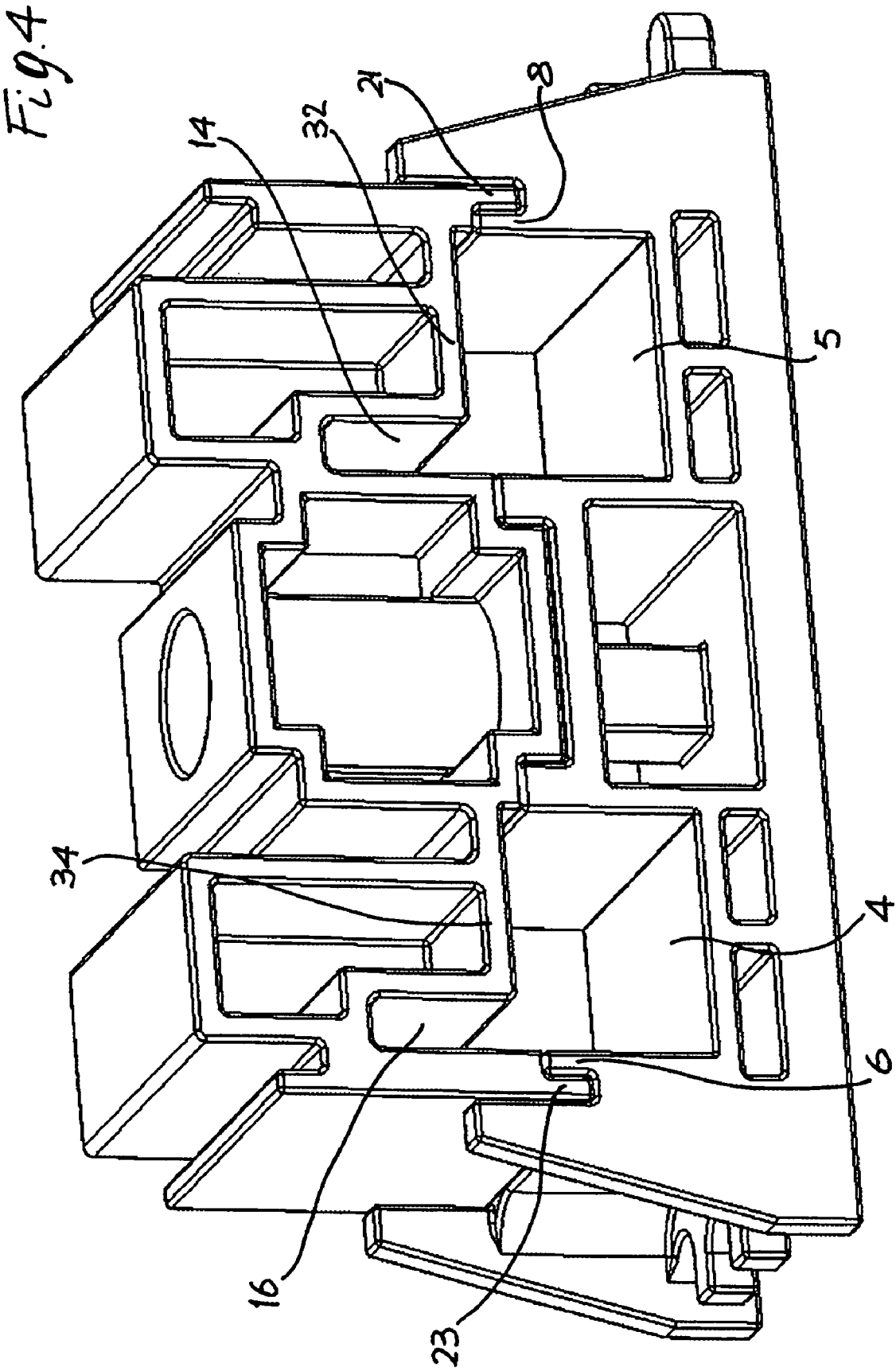
FIG. 4 is a perspective view illustrating the device according to the invention with the two modules coupled, in a second embodiment.

Furthermore, starting from the position of FIG. 2, the module 10 can be rotated through 180° (in both directions of rotation, as indicated by the arrow 53) about an axis perpendicular to the middle plane 50 and directed according to the longitudinal development of the walls 11 and 13, thus bringing the seat 16 (and corresponding walls) to mate with the seat 5 (and corresponding walls) and the seat 14 (and corresponding walls) to mate with the seat 4 (and corresponding walls), forming in this way two seats for housing two L-shaped bars that are the same as the ones illustrated in FIG. 4, but with the horizontal branches of the L oriented on opposite sides. In said configuration, there are the following couplings: the step-like surfaces 23-8, the step-like surfaces 21-6, the tooth 7-step-like surface 22, groove 19 and tooth 9-step-like surface 24.

Advantageously, in the device according to the invention, each pair of modules 1-10 can be coupled to a further pair of modules 1-10, by the slotting means provided on the transverse walls 31 and 32 of the module 1. In fact, as for example illustrated in FIG. 5, the two modules 1, each coupled to the respective module 10, are coupled to one another by inserting the teeth 37 of one of the two modules 1 in the respective U-shaped concavities of the other, in an extremely simple and effective manner. In this way, a device with four L-shaped aligned housing seats is obtained, with the horizontal branches of the L oriented all in the same direction, or set two by two opposite to one another as in FIG. 5, with the two branches of the L of the same thickness (see FIG. 5) or of different thickness (see FIG. 4, in which just one pair of modules 1-10 is illustrated).

Figure 5:
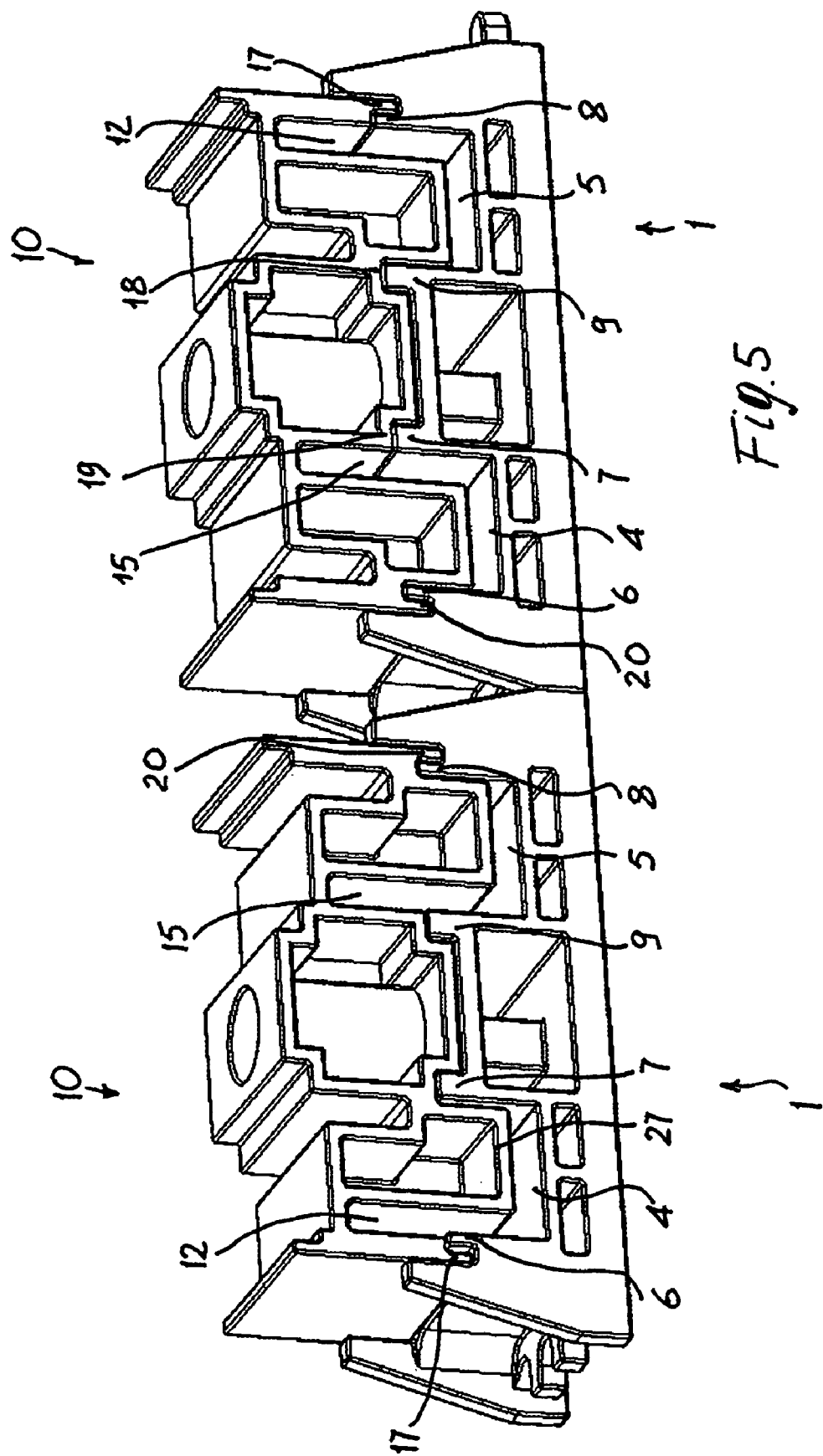
FIG. 5 is a perspective view illustrating a further embodiment of the device according to the invention.

Whatever the desired configuration, fixing of the device to the cabinet 100 of the switchboard, in the example of FIG. 5 to the cross member 60, is achieved using ordinary fixing means 70 inserted in the path defined by the two aligned channels 25 and 26, according to an extremely simple and effective solution. Where desired, further fixing means 70 can be used on the sides of the modules by coupling them to the teeth 37 and/or 38 inserted in the spaces defined thereby. The assembly is then completed by electrically connecting the bars 90 to the apparatus or apparatuses 80 of the electrical switchboard.

It is in practice clear how the device according to the invention fully accomplishes the task, as well as the purposes referred to in the preamble, by providing a series of advantages with respect to the known art. In fact, as previously illustrated, the two modules of the device, by virtue of their innovative structure, enable an interchangeablity of coupling that is extremely flexible and simple, which makes possible a number of configurations, without having to resort to other components, and without even changing types or dimensions of the device itself, or of any of its constituent parts, as occurs, instead, in the devices of the known art.

A further advantage is represented by the fact that it integrates in the structure of the two modules the mutual coupling means. In this way, there is a reduction in the number of components to be used and a simplification of the operations of assembly. Also extremely simple are the operations of fixing to the supporting structure of the frame of the cabinet.

The device thus devised may undergo numerous modifications and variations, all of which fail within the scope of the inventive idea; furthermore, all the items may be replaced by other technically equivalent elements. For example, the various means of connection could be prearranged in positions different from the ones described, or else be differently shaped, for example with the step-like surfaces rounded, or else with the teeth differently shaped, or with yet other shapes provided that they are compatible with the functions envisaged. Likewise, the number of the seats in each module could be modified; for example, modules with just one seat could be used, such as the portion of module 10 defined from the end on which there is defined one of the two step-like surfaces 17 or 20 as far as the part of the U-shaped grooves 19 or 20 and of the steps 24 or 22, and a corresponding portion of module 1 including a seat and the corresponding means of connection (the step-like surface 6/or 8, the tooth 7/or 9). Furthermore, the module 1 or 10 could be made with a greater number of seats, for example by englobing in a single module the two pairs of modules 1 and 10, respectively.

In practice, the materials, as well as the dimensions, may be any whatsoever according to the requirements and the state of the art.

The invention claimed is:

1. A supporting device for busbars in a cabinet for an electrical switchboard comprising:
   at least one first module having a shaped body designed to be connected to a supporting element of the cabinet, said first module being made substantially of electrically insulating material and having a first wall designed to be set resting on said supporting element, and
   a second wall, along which there is defined at least one first coupling seat;
   wherein said supporting device being characterized in that it comprises at least one second module having a shaped body made substantially of electrically insulating material that has a third wall, along which there is defined at least one second coupling seat,
   a fourth wall, along which there is defined at least one third coupling seat, said second module being operatively coupleable to said first module alternatively with said third or said fourth wall facing said second wall so that said first seat mates geometrically with said second or said third seat, so forming a seat for housing a busbar,
   on said second wall, there is defined a further fourth coupling seat, said first and fourth seats being arranged substantially symmetrical to one another with respect to a middle plane of the first module perpendicular to said second wall, and
   on said fourth wall, there is defined a sixth coupling seat, said third and sixth coupling seats being shaped and arranged along said fourth wall so as to enable geometrical mating of each alternatively with said first seat or said second seat, so forming in pairs two seats for housing two corresponding bars.

2. The device according to claim 1, characterized in that said first and second modules are shaped so as to present respective coupling means geometrically mated together and designed to enable a direct structural connection of said first module with said second module.

3. The device according to claim 2, characterized in that said coupling means comprise first, second and third means of connection defined, respectively on said second, third and fourth walls, said first means of connection being coupleable alternatively to said second or to said third means of connection.

4. The device according to claim 3, characterized in that said first means of connection comprise at least one first step-shaped surface and a first tooth defined at the sides of said first seat on sides opposite to one another.

5. A device according to claim 4, characterized in that said first means of connection comprise a second step-shaped surface and a second tooth defined at the sides of said fourth seat on sides opposite to one another, said first and second step-shaped surfaces being set at the two ends of said second wall symmetrically to one another with respect to said middle plane, said first and second teeth being arranged symmetrically to one another with respect to said middle plane.

6. The device according to claim 3, characterized in that said second means of connection comprise at least one third step-shaped surface defined in a position corresponding to an edge of said second coupling seat and at least one first U-shaped channel with the two branches of the U of lengths different from one another.

7. The device according to claim 6, characterized in that said second means of connection comprise a second substantially L-shaped channel set in a position corresponding to an edge of said fifth seat and a fourth step-shaped surface, said second and fourth step-shaped surfaces being defined in positions corresponding to the two ends of said third wall.

8. The device according to claim 3, characterized in that said third means of connection comprise at least one fifth step-shaped surface defined in a position corresponding to one end of said fourth wall, and at least one sixth step-shaped surface defined in a position corresponding to an edge of said third coupling seat.

9. The device according to claim 8, characterized in that said third means of connection moreover comprise a seventh step-shaped surface defined in a position corresponding to one end of said fourth wall in the proximity of an edge of said sixth coupling seat.

10. The device according to claim 8, characterized in that said third means of connection comprise at least one eighth step-shaped surface, said sixth and eighth step-shaped surfaces being arranged substantially symmetrical with respect to a middle plane of the second module substantially perpendicular to said fourth wall.

11. The device according to claim 1, characterized in that, on said third wall, there is defined a fifth coupling seat, said second and fifth seats being shaped and arranged along said third wall so as to enable geometrical mating of each alternatively with said first seat or said fourth seat, so forming two seats for housing two corresponding bars.

12. A device according to claim 1, characterized in that said first means of connection comprise a second step-shaped surface and a second tooth defined at the sides of said fourth seat on sides opposite to one another, said first and second step-shaped surfaces being set at the two ends of said second wall symmetrically to one another with respect to said middle plane, said first and second teeth being arranged symmetrically to one another with respect to said middle plane.

13. The device according to claim 1, characterized in that, on said first module, there is defined a first through channel with a substantially rectilinear axis, said first channel being defined along the directrix of first-second walls and being designed to receive means of fixing to said supporting element.

14. The device according to claim 13, characterized in that, on said second module, there is defined a second through channel with a substantially rectilinear axis, said second through channel being defined along the directrix of third-fourth walls, so as to be aligned with said first channel and receive said fixing means.

15. The device according to claim 1, characterized in that the shaped body of the first module comprises third and fourth walls set transverse to said first and second walls, from which there extend, on sides opposite to one another, respective slotting means for coupling to at least one further module.

16. The device according to claim 15, characterized in that said slotting means for coupling comprise at least one projecting tooth with a rounded edge defined on said transverse third wall and at least one pair of projecting teeth that delimit between them a U-shaped seat on said fourth transverse wall.

17. The device according to claim 1, characterized in that it comprises a pair of first modules arranged alongside and connected to one another by means of said slotting means for coupling, and a pair of second modules coupled each to a corresponding first module.

18. An electrical switchboard comprising a cabinet, at least one electrical apparatus, and a plurality of busbars, characterized in that it comprises at least one supporting device for said busbars according to claim 1.

* * * * *